(12) United States Patent
Liu et al.

(10) Patent No.: US 9,776,381 B2
(45) Date of Patent: Oct. 3, 2017

(54) TEAR RESISTANT MULTILAYER FILM

(71) Applicant: 3M INNOVATIVE PROPERTIES COMPANY, St. Paul, MN (US)

(72) Inventors: Richard Y. Liu, Woodbury, MN (US); Stephen A. Johnson, Woodbury, MN (US); John P. Purcell, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 49 days.

(21) Appl. No.: 14/574,820

(22) Filed: Dec. 18, 2014

(65) Prior Publication Data

US 2016/0176165 A1 Jun. 23, 2016

(51) Int. Cl.
*B32B 7/12* (2006.01)
*B32B 17/00* (2006.01)
(Continued)

(52) U.S. Cl.
CPC .......... *B32B 27/08* (2013.01); *B29C 47/0004* (2013.01); *B32B 7/12* (2013.01); *B32B 17/00* (2013.01); *B32B 17/064* (2013.01); *B32B 27/36* (2013.01); *C08L 1/00* (2013.01); *C08L 67/03* (2013.01); *B29C 47/0021* (2013.01); *B29C 47/0057* (2013.01); *B29C 47/061* (2013.01); *B29C 47/065* (2013.01); *B29K 2067/003* (2013.01); *B29L 2009/00* (2013.01); *B32B 2250/05* (2013.01); *B32B 2250/244* (2013.01); *B32B 2255/10* (2013.01);
(Continued)

(58) Field of Classification Search
None
See application file for complete search history.

(56) References Cited

U.S. PATENT DOCUMENTS 5,422,189 A 6/1995 Warner
5,427,842 A 6/1995 Bland
(Continued)

FOREIGN PATENT DOCUMENTS

EP 0581970 2/1994
EP 0591055 4/1994
(Continued)

*Primary Examiner* — Frank D Ducheneaux
(74) *Attorney, Agent, or Firm* — Clifton F. Richardson

(57) ABSTRACT

A tear resistant multilayer film including a stack of polymeric layers that includes first and second layer types. Layers of the first layer type includes a first polymer and the layers of the second layer type includes a second polymer. The first polymer is polyethylene terephthalate or a first ester block copolymer that includes polyethylene terephthalate blocks at a weight percent of the first ester block copolymer of at least 50 percent and further includes glycol-modified polyethylene terephthalate blocks. The second polymer is sebacic acid-substituted polyethylene terephthalate or a second ester block copolymer that includes sebacic acid-substituted polyethylene terephthalate blocks at a weight percent of the second ester block copolymer of at least 50 percent and further includes polyethylene terephthalate blocks or glycol-modified polyethylene terephthalate blocks. The tear resistant multilayer film includes a total of 8 to 300 layers of the first and second layer types.

20 Claims, 2 Drawing Sheets

(51) Int. Cl.
  *B32B 27/08* (2006.01)
  *B32B 27/36* (2006.01)
  *B29C 47/06* (2006.01)
  *C08L 67/03* (2006.01)
  *B29C 47/00* (2006.01)
  *B32B 17/06* (2006.01)
  *C08L 1/00* (2006.01)
  *C09J 7/02* (2006.01)
  *B29K 67/00* (2006.01)
  *B29L 9/00* (2006.01)

(52) U.S. Cl.
  CPC ....... *B32B 2255/26* (2013.01); *B32B 2270/00* (2013.01); *B32B 2307/412* (2013.01); *B32B 2307/516* (2013.01); *B32B 2307/518* (2013.01); *B32B 2307/54* (2013.01); *B32B 2307/5825* (2013.01); *B32B 2405/00* (2013.01); *B32B 2419/00* (2013.01); *B32B 2571/00* (2013.01); *C09J 7/0285* (2013.01); *C09J 2467/006* (2013.01)

(56) References Cited

U.S. PATENT DOCUMENTS

| | | |
|---|---|---|
| 5,604,019 A | 2/1997 | Bland |
| 6,040,061 A | 3/2000 | Bland |
| 6,767,492 B2 | 7/2004 | Norquist |
| 7,410,686 B2 | 8/2008 | Osada |
| 8,168,302 B2 * | 5/2012 | Hebrink ............... A61B 5/0803 |
| | | 428/480 |
| 8,432,624 B2 * | 4/2013 | Toda ...................... G02B 1/115 |
| | | 351/159.57 |
| 2003/0116880 A1 | 6/2003 | Mueller |
| 2008/0075948 A1 | 3/2008 | Padiyath et al. |
| 2013/0302594 A1 | 11/2013 | Sugiyama |

FOREIGN PATENT DOCUMENTS

| | | |
|---|---|---|
| EP | 1452308 | 9/2004 |
| WO | WO 2013-080143 | 6/2013 |

* cited by examiner

TEAR RESISTANT MULTILAYER FILM

BACKGROUND

Tear resistant multilayer films are known. For example, U.S. Pat. No. 6,040,061 (Bland et al.) describes a tear resistant film having layers selected from a stiff polyester or copolyester, a ductile sebacic acid based copolyester, and optionally, an intermediate material. Tear resistant multilayer films can be applied to glass to improve the shatter resistance of the glass.

SUMMARY

In some aspects of the present description, a tear resistant multilayer film including a stack of polymeric layers having first and second layer types is provided. The polymeric layers of the first layer type includes a first polymer and the polymeric layers of the second layer type includes a second polymer. The polymeric layers are arranged such that no two layers of the first layer type are immediately adjacent and such that no two layers of the second layer type are immediately adjacent. The first polymer is polyethylene terephthalate or a first ester block copolymer including polyethylene terephthalate blocks at a weight percent of the first ester block copolymer of at least 50 percent, where the ester block copolymer further includes glycol-modified polyethylene terephthalate blocks. The second polymer is sebacic acid-substituted polyethylene terephthalate or a second ester block copolymer including sebacic acid-substituted polyethylene terephthalate blocks at a weight percent of the second ester block copolymer of at least 50 percent, where the second ester block copolymer further includes polyethylene terephthalate blocks, glycol-modified polyethylene terephthalate blocks, or a combination thereof. The tear resistant multilayer film includes a total number of layers of the first and second layer types in a range of 8 to 300. At least one of the following conditions is satisfied: (i) the first polymer is the first ester block copolymer and includes glycol-modified polyethylene terephthalate blocks at a weight percent of the first ester block copolymer of at least about 5 percent, and (ii) the second polymer is the second ester block copolymer and includes polyethylene terephthalate blocks, glycol-modified polyethylene terephthalate blocks, or a combination thereof at a weight percent of the second ester block copolymer of at least about 5 percent.

In some aspects of the present description, a laminate is provided that includes a glass and the tear resistant multilayer film attached to the glass with an optically clear adhesive layer.

In some aspects of the present description, methods of making the tear resistant multilayer film are provided.

DETAILED DESCRIPTION

Figure 1:
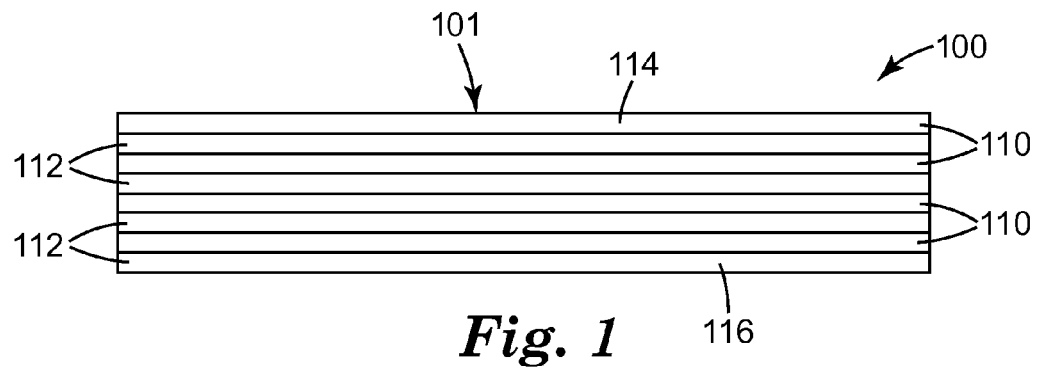
FIG. 1 is a cross-sectional view of a tear resistant multilayer film.

In the following description, reference is made to the accompanying drawings that forms a part hereof and in which are shown by way of illustration. The drawings are not necessarily to scale. It is to be understood that other embodiments are contemplated and may be made without departing from the scope or spirit of the present disclosure.

As used herein, layers, components, or elements may be described as being adjacent one another. Layers, components, or elements can be adjacent one another by being in direct contact, by being connected through one or more other components, or by being held next to one another or attached to one another. Layers, components, or elements that are in direct contact may be described as being immediately adjacent.

Tear resistant multilayer films that include a plurality of stiff layers and a plurality of ductile layers are known. However, such films are typically made by laminating the various layers together with adhesive layers and this adds unwanted costs to the films. Multilayer films can alternatively be made via a coextrusion process. However, when conventional materials are coextruded to form a multilayer film having a desired thickness and tear resistance performance, the haze of the multilayer film can be too high for many applications. For example, in some cases it is desired to attach a tear resistant multilayer film to a window for improved shatter resistance. It is typically desired for such window films to have a low haze (e.g., less than 2 percent). According to the present description, modified materials have been discovered that allow multilayer films to be coextruded at sufficient thicknesses that good tear resistance performance is obtained without sacrificing clarity.

As described in U.S. Pat. No. 5,604,019 (Bland et al.) and U.S. Pat. No. 6,040,061 (Bland et al.), for example, suitable stiff layers (which is a first layer type) for multilayer films include polyethylene terephthalate (PET) and suitable ductile layers (which is a second layer type) for multilayer films include sebacic acid-substituted polyethylene terephthalate (SA-PET). Sebacic acid-substituted polyethylene terephthalate refers to a polyethylene terephthalate with some of the terephthalic acid-derived moieties replaced with sebacic acid-derived moieties, and can be prepared by reacting terephthalic acid, sebacic acid and ethylene glycol. For example, SA-PET may be the reaction product of about 40 to about 80 mole equivalents terephthalic acid, about 40 to about 20 mole equivalents sebacic acid, and about 100 mole equivalents ethylene glycol. In some embodiments, SA-PET may be the reaction product of about 50 to about 70 mole equivalents terephthalic acid, about 50 to about 30 mole equivalents sebacic acid, and about 100 mole equivalents ethylene glycol.

According to the present description, it has been found that improved multilayer film can be obtained by replacing SA-PET in the second layer types with an ester block copolymer that includes SA-PET blocks and that includes PET blocks and/or glycol-modified polyethylene terephthalate (PETG) blocks. According to the present description, it has been found that improved multilayer film can be obtained by replacing PET in the first layer types with an ester block copolymer that includes PETG blocks. It has been found that a multilayer film using an ester block copolymer that includes SA-PET blocks as the second layer type and using PET as a first layer type or that a multilayer film using SA-PET as the second layer type and using an ester block copolymer that includes PETG blocks as the first layer type provides improved optical and mechanical properties compared with multilayer films using SA-PET as the second layer type and PET as the first layer type. In some embodiments, both the first and second layer types include ester block copolymers. In contrast to conventional tear resistant multilayer films, the improved multilayer films of the present description can simultaneously be thick (e.g., 100 µm to 500 µm) and have a low haze (e.g., less than 2 percent).

PET is commercially available from DuPont (Wilmington, Del.), for example. PET can be formed as the reaction product of terephthalic acid and ethylene glycol. PETG can be formed from a similar reaction where some portion of the ethylene glycol is replaced with another component such as cyclohexanedimethanol. In some embodiments, the PETG used in the multilayer films of the present description is the reaction product of about 100 mole equivalents terephthalic acid, about 70 to about 98 mole equivalents ethylene glycol and about 30 to about 2 mole equivalents cyclohexanedimethanol. In some embodiments, the PETG is the reaction product of about 100 mole equivalents terephthalic acid, about 90 to about 98 mole equivalents ethylene glycol and about 10 to about 2 mole equivalents cyclohexanedimethanol. PETG is commercially available from Eastman Chemical (Kingsport, Tenn.) and SK Chemicals Co. Ltd. (Korea), for example.

Ester block copolymers are block copolymers that include blocks of a first polyester and blocks of a second polyester different from the first polyester. Ester block copolymers may also include blocks of a third polyester (or fourth polyester or more) different from the first and second polyester. Ester block copolymers can be made by a transesterification reaction where a first polyester is blended with a second polyester under heat. Interactions between molecules of the first polyester and molecules of the second polyester result in exchanges of portions of the molecules which produces new molecules having blocks of the first polyester and blocks of the second polyester. The various weight fractions of the various blocks in the ester block copolymer can be adjusted by changing the relative ratio of the polyesters added to the transesterification reactor. As is discussed in greater detail elsewhere, transesterification reactions can take place through in-line reactive extrusion.

There are many polyesters that could be considered for forming blocks in an ester block copolymer that includes SA-PET blocks at greater than about 50 weight percent of the ester block copolymer. Such polyesters include, PET, PETG, polyethylene naphthalate (PEN), glycol-modified PEN (PENG), NEOSTAR Elastomer FN007 (a low Tg copolyester available from Eastman Chemical), a random copolymer of 90 mole percent PEN moieties and 10 mole percent PET moieties (CoPEN9010), a blend of PET and PEN at an 80:20 ratio by weight, 50:50 by weight blends of PET and CoPEN9010, or PET and PENG, or PETG and PEN, or PETG and CoPEN9010, or PETG and PENG. Of these possibilities, it has been discovered that only PET and PETG are suitable for modifying SA-PET to form an ester block copolymer that has desirable mechanical and processing properties and that maintains a low haze. It has been found that ester block copolymers that includes SA-PET at a weight percent of the ester block copolymer in a range from about 70 percent to about 95 percent and that includes PET blocks, PETG blocks, or a combination of PET blocks and PETG blocks in a range of about 5 percent to about 30 percent provides desirable haze and mechanical properties. A lower concentration of PET and/or PETG has been found to result in undesirable haze while a higher concentration has been found to result in a stiffness that is too high for providing a desired degree of tear resistance.

Similarly, there are many polyesters that could be considered for forming blocks in an ester block copolymer that includes PET blocks at greater than about 50 weight percent of the ester block copolymer. It has been found that ester block copolymers that includes PET blocks at a weight percent of the first ester block copolymer in a range from about 60 percent to about 95 percent and that includes PETG blocks at a weight percent of the ester block copolymer in a range from about 5 percent to about 40 percent provides desirable haze and mechanical properties. A lower concentration of PETG has been found to result in undesirable haze while a higher concentration has been found to result in reduced strain induced crystallinity and/or reduced film processability (e.g., reduced heat set window) and this can result in polymer layers with poor toughness or poor stability.

In addition to providing improved optical and mechanical properties of multilayer films, the ester block copolymers of the present description provide improved rheological properties which can aid in the melt processing of the polymers. For example, a typical melt processing temperature for PET is 280° C. At this temperature an ester block copolymer that includes 75 weight percent SA-PET blocks and 25 weight percent of PET blocks or PETG blocks has a viscosity about twice that of SA-PET. This can translate into up to about a 40° C. increase in processing temperature for the ester block copolymer and this can allow for a more robust coextrusion that produces higher quality film (e.g., film with fewer optical defects).

FIG. 1 is a cross-sectional view of multilayer film 100 which includes a stack of polymeric layers 101 that includes layers of a first type 110 and layers of a second type 112. The stack of polymeric layers 101 includes a first outermost layer 114 and an opposite second outermost layer 116. Layers of the first type 110 are formed from a first polymer and layers of the second type 112 are formed from a second polymer different from the first polymer. The first polymer may be PET or a first ester block copolymer that includes PET blocks at a weight percent of the first ester block copolymer of at least 50 percent and that further includes PETG blocks. The second polymer may be SA-PET or a second ester block copolymer that includes SA-PET blocks at a weight percent of the second ester block copolymer of at least 50 percent and that further includes PET blocks, PETG blocks, or both PET blocks and PETG blocks. In some embodiments, at least one of the first and second polymers are the first or second ester block copolymers, respectively. In some embodiments, one or both of the following conditions is satisfied: (i) the first polymer is the first ester block copolymer and includes PETG blocks at a weight percent of the first ester block copolymer of at least about 5 percent, and (ii) the second polymer is the second ester block copolymer and includes PET blocks, PETG blocks, or a combination of PET blocks and PETG blocks at a weight percent of the second ester block copolymer of at least about 5 percent.

In some embodiments, the second polymer is the second ester block copolymer and includes SA-PET at a weight percent of the second ester block copolymer in a range from about 70 percent to about 95 percent or in a range from about 70 percent to about 90 percent. In some embodiments, the second polymer is the second ester block copolymer and includes PET blocks, PETG blocks, or a combination of PET blocks and PETG blocks in a range of about 5 percent to about 30 percent or in a range of about 10 percent to about 30 percent.

In some embodiments, the first polymer is the first ester block copolymer and includes PET blocks at a weight percent of the first ester block copolymer in a range from about 60 percent to about 95 percent or in a range of about 60 percent to about 90 percent. In some embodiments, the first polymer is the first ester block copolymer and includes PETG blocks at a weight percent of the first ester block copolymer in a range from about 5 percent to about 40 percent or in a range from about 10 percent to about 40 percent.

In some embodiments, the first polymer is the first ester block copolymer and the second polymer is the second ester block copolymer and the first ester block copolymer includes PETG blocks at a weight percent of the first ester block copolymer in a range of about 5 percent to about 40 percent and the second ester block copolymer includes PET blocks, PETG blocks, or a combination of PET blocks and PETG blocks at a weight percent of the second ester block copolymer in a range of about 5 percent to about 30 percent.

An ester block copolymer that includes PET blocks at greater than 50 weight percent of the ester block copolymer may be referred to as modified PET. An ester block copolymer that includes SA-PET blocks at greater than 50 weight percent of the ester block copolymer may be referred to as modified SA-PET.

The layers of the first layer type may be stiff and the layers of the second layer type may be ductile. Stiff layers refers to layers having a tensile modulus greater than 1.5 GPa or greater than 2 GPa as measured according to ASTM D 882-12 at 23° C. Ductile layers refers to layers that have a tensile modules less than 1.4 GPa or less than 1.0 GPa as measured according to ASTM D 882-12 at 23° C. and that has elongation at break of greater than 50 percent or greater than 100 percent according to ASTM D 882-12 at 23° C. The stiff layers may be PET or modified PET and the ductile layers may be SA-PET or modified SA-PET, where at least some of the stiff layers are modified PET or at least some of the ductile layers are modified SA-PET. The stack of polymeric layers of the tear resistant multilayer films may include the ductile layers at a weight percent of the stack in a range from about 1 percent to about 20 percent or in a range of about 5 percent to about 20 percent. Accordingly, the thickness of the ductile layers may be substantially less than that of the stiff layers. For example, the thickness of the ductile layers may be only about 0.1 times the thickness of the stiff layers. Using a relatively low weight fraction of the ductile layers provides significant improvements in the tear resistances of the multilayer films.

In some embodiments, the multilayer film 100 includes a stack of polymeric layers 101 that includes a total number of layers of the first and second layer types 110 and 112 that is at least 6, or at least 7, or at least 8, or at least 9, or at least 10 and that is no more than 300, or no more than 200, or no more 100, or no more than 50, or no more than 30, or no more than 20. For example, in some embodiments, the multilayer film 100 includes a stack of polymeric layers 101 that includes a total number of layers of the first and second layer types 110 and 112 that is in the range of 8 to 300, or that is in the range of 9 to 30, or that is in the range of 10 to 20.

In the embodiment illustrated in FIG. 1, the stack of polymeric layers 101 include alternating layers of the first and second layer types 110 and 112. In alternate embodiments, additional layers of a third layer type, different from the first and second layer types, are included that separate layers of the first and second layer types 110 and 112. In such embodiments, layers of the first and second layer types 110 and 112 may be arranged in any order. For example, the first and second layer types 110 and 113 may alternate from one type to the other or a random or pseudo-random distribution may be utilized. The ordering of the polymeric layers may be selected such that no two layers of the first layer type 110 are immediately adjacent and such that no two layers of the second layer type 112 are immediately adjacent since two layers of the same layer type that were immediately adjacent could be described as a single thicker layer. In some embodiments, the stack of polymeric layers 101 consists essentially of alternating layers of the first and second layer types 110 and 112 with no layers of a third layer type separating layers of the first and second layer types 110 and 112. In other embodiments, a third layer type may be included. For example, the third layer type may be a tie layer that improves the interlayer bonding of dissimilar layers in the stack. Suitable tie layers are described in U.S. Pat. No. 6,040,061 (Bland et al.), for example.

The first and second outermost layers 114 and 116 can be either of the first or the second layer types 110 and 112. In the embodiment illustrated in FIG. 1, the first outermost layer 114 is a layer of the first layer type 110 and the second outermost layer 116 is a layer of the second layer type 112. In other embodiments, the first and second outermost layers 114 and 116 can be both be of the first layer type or of the second layer type. In still other embodiments, one or both outermost layers are of a layer type different from the first and second layer types.

In some embodiments, the stack of polymeric layers 101 is stretched so that the polymeric layers are biaxially or uniaxially oriented. In some embodiments, the stack of polymeric layers 101 is stretched at a draw ratio greater that about 1.5 or greater than about 2.0 and less than about 10.0 or less than about 6.0 in one or both in-plane directions (i.e., in the transverse direction (TD) and/or in the machine direction (MD)). Orienting the polymeric layers can improve the mechanical properties (e.g., tensile modulus) of the layers and can result in a multilayer film having a higher tear resistance.

Tear resistance can be determined using a Graves tear test as described in ASTM D1004-13 "Standard Test Method for Tear Resistance (Graves Tear) of Plastic Film and Sheeting". The Graves tear test determines a tear resistance (maximum force) and an elongation at break. In some embodiments, a multilayer film according to the present description has a Graves tear resistance of at least about 25 N, or at least about 50 N, or at least about 100 N and may be up to about 300 N or up to about 500 N, in each of a first direction and a second direction different from the first direction and has a Graves elongation at break of at least about 20 percent, or at least about 30 percent, or at least about 40 percent, and may be up to about 100 percent, or up to about 200 percent, in each of the first and second directions. For example, in some embodiments, a multilayer film according to the present description has a Graves tear resistance in a range of about 25 N to about 500 N in each of a first direction and a second direction different from the first direction and has a Graves elongation at break in a range of about 20 percent to about 200 percent in each of the first and second directions. The first and second directions may refer to principle in-plane axes of the film which may be the TD direction and the MD direction, respectively. The first and second directions may be orthogonal or substantially orthogonal in-plane directions.

The Graves tear test allows an applied force as a function of the percent elongation of the test sample to be determined Graves Area refers to the area under the force versus percent elongation curve and may be expressed in units of a force times a percent. The Graves Area is a useful measure of the toughness of a tear resistant film. In some embodiments, the multilayer tear resistant film has a Graves Area of at least 1 kN x %, or at least 2 kN × %, or at least 3 kN × %, and may be up to about 10 kN × %, or up to about 20 kN × %, in each of a first and a second direction which may be the TD direction and the MD direction, respectively. For example, in some embodiments, the multilayer tear resistant film has a Graves Area in the range of about 1 kN × % to about 20 kN × % in each of the MD and TD directions.

Tear resistance can also be measured using a puncture-propagation tear resistance test. As used herein, PPT tear resistance refers to the puncture-propagation tear resistance determined as described in ASTM D2582-09 except that a carriage weight of 698.5 grams and a drop height of 17.0 cm is used in the test, unless indicated otherwise. In some embodiments, the multilayer tear resistant film has a PPT tear resistance of at least 2 kg or at least 2.5 kg in each of a first and a second direction which may be the TD direction and the MD direction, respectively. In some embodiments, the multilayer tear resistant film has a PPT tear resistance in the range of about 2 kg to about 10 kg in each of the MD and TD directions.

Figure 2:
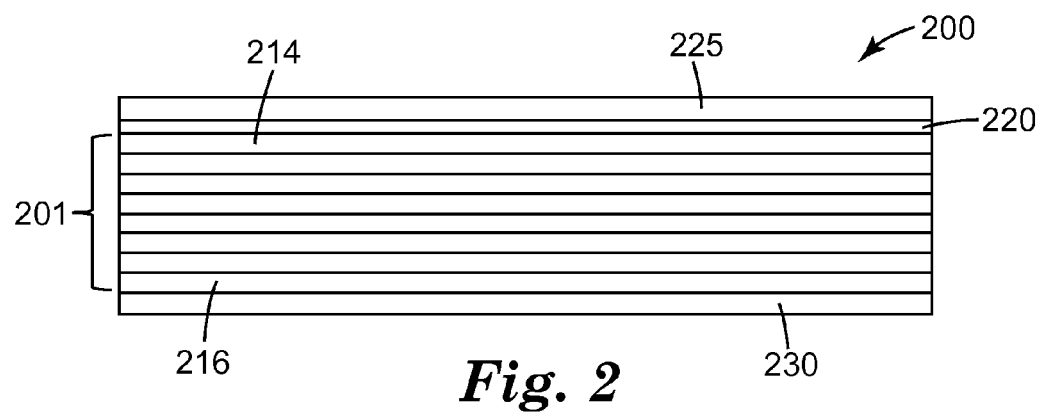
FIG. 2 is a cross-sectional view of a tear resistant multilayer film.

FIG. 2 is a cross-sectional view of multilayer film 200 which includes a stack of polymeric layers 201 that has a first outermost layer 214 and a second outermost layer 216 opposite the first outermost layer 214. The stack of polymeric layers 201 may correspond to the stack of polymeric layers 101 of FIG. 1. A primer layer 220 is disposed on the first outermost layer 214 and a hard coat layer 225 is disposed on the primer layer 220. An optically clear adhesive layer 230 is disposed on the second outermost layer 216.

Suitable materials for primer layer 220 include 3M Primer 94, for example, which is available from 3M Company (St. Paul, Minn.). Other suitable primers include chemistries of ionomer, polyvinylidene chloride (PVDC), and/or amine based moieties. In alternative embodiments, a surface treatment, such a flame or corona discharge treatment is applied to first outermost layer 214 and no primer layer is included between first outermost layer 214 and hard coat layer 225. Suitable materials for hard coat layer 225 includes radiation (e.g., ultraviolet) curable materials such as an acrylate or methacrylate. The acrylate or methacrylate may include nanoparticles to increase the hardness of the hard coat. Suitable hard coats include those described in U.S. Pat. App. Pub. No. 2013/0302594 (Sugiyama et al.), for example. Suitable adhesive layers useful for optically clear adhesive layer 230 include 3M Optically Clear Adhesives 8171 and 8172, for example, both available from 3M Company (St. Paul, Minn.). Other suitable adhesives may be derived from chemistries such as acrylic, polyester, polyurethane, polyolefin, and/or silicone. In some embodiments, the second outermost layer 216 is surface treated prior to applying optically clear adhesive layer 230.

Haze can be defined as the percent of transmitted light that is scattered so that its direction deviates more than 2.5 degrees from the direction of the incident beam as specified in ASTM D1003-13 "Standard Test Method for Haze and Luminous Transmittance of Transparent Plastics". Haze can be determined using a HAZE-GARD PLUS meter available from BYK-Gardner Inc. (Silver Springs, Md.) which is said to comply with the ASTM D1003-13 standard. In some embodiments, the multilayer film 200 is substantially transparent. For example, the multilayer film 200 may have a total luminous transmittance of at least 85 percent or at least 90 percent according to the ASTM D1003-13 standard. In some embodiments, the haze of multilayer film 200 or the haze of the stack of polymeric layers 201 may be less than about 2.0 percent, less than about 1.75 percent, less than about 1.5 percent, less than about 1.25 percent, or less than about 1.0 percent and may be as low as about 0.5 percent or about 0.2 percent. For example, in some embodiments, the haze of multilayer film 200 or the haze of the stack of polymeric layers 201 may be in a range of about 0.2 percent to about 2.0 percent.

In some embodiments, the thickness of multilayer film 200 or the thickness of the stack of polymeric layers 201 may be greater than about 50 microns, greater than about 100 microns, or greater than about 150 microns and may be less than about 600 microns or less than about 500 microns.

In some embodiments, multilayer film 200 is a tear resistant film that is suitable for use as a window film. Such a window film can prevent a window from shattering. In some embodiments, a window film is attached to one major surface of a glass and in some embodiments, window films are attached to both major surfaces of a glass.

Figure 3:
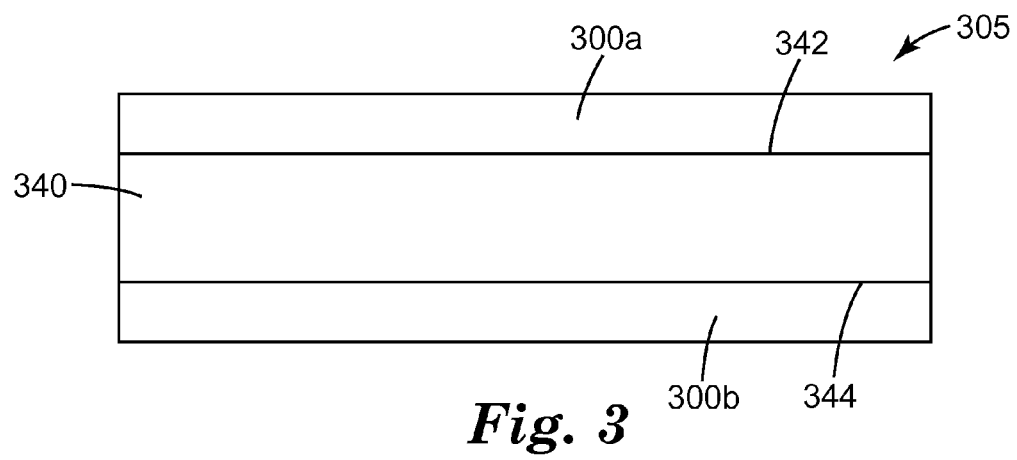
FIG. 3 is a schematic cross-sectional view of a laminate that includes two tear resistant multilayer films.

FIG. 3 is a schematic cross-sectional view of laminate 305 that includes glass 340 having first major surface 342 and opposite second major surface 344. Laminate 305 includes first and second multilayer films 300a and 300b. Each of the first and second multilayer films 300a and 300b may correspond to multilayer film 200 and may include a polymeric stack and an optically clear adhesive layer. First multilayer film 300a is attached to glass 340 with the optically clear adhesive layer of the first multilayer film 300a disposed on the first major surface 342. Second multilayer film 300b is attached to glass 340 with the optically clear adhesive layer of the second multilayer film 300b disposed on the second major surface 344.

Figure 4:
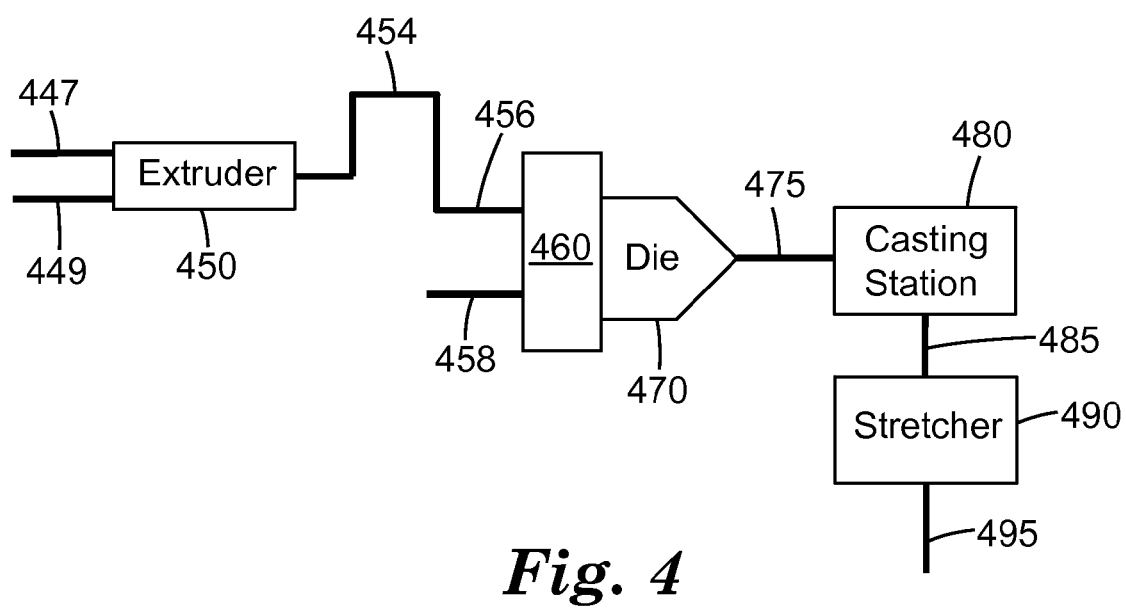
FIG. 4 is a schematic illustration of a process for making tear resistant multilayer films.

FIG. 4 is a schematic illustration of a process for making a multilayer film according to the present description that includes in-line reactive extrusion to produce an ester block copolymer. A first polyester 447 and a second polyester 449 are fed into extruder 450 which melts and mixes the polyesters. Extruder 450 feeds the resulting melt stream into neck tube 454 which feeds a first polymer 456 in its molten state into feedblock 460. The melt stream through extruder 450 and neck tube 454 has a high temperature so that transesterification reactions take place between first and second polyesters 447 and 449 resulting in a first polymer 456 which is an ester block copolymer. In some embodiments, the melt stream has a temperature in the range of 200° C. to 350° C. for about 1 minute to about 5 minutes while the melt stream is in extruder 450 and for about 10 minutes to about 20 minutes while the melt stream is in neck tube 454. The extruder 450 may be a single screw extruder or a twin screw extruder and may include a gear pump. The extruder 450 may provide a high shear and may operate at about 100 to about 500 revolutions per minute (RPM). The extruder 450 may produce a pressure in the range of about 3 MPa to about 15 MPa in neck tube 454. In some embodiments, additional polyesters may be fed into extruder 450 to form an ester block copolymer having more than two types of blocks. For example, a modified SA-PET ester block copolymer can be made by feeding SA-PET, PET and PETG into an in-line reactive extruder.

Since first polymer 456 is formed through a transesterification reaction that takes place as it passes through extruder 450 and neck tube 454, the process for forming first polymer 456 may be referred to as in-line reactive extrusion. A second polymer 458 is fed into feedblock 460 in its molten form. Second polymer 458 may also be an ester block copolymer that is formed through in-line reactive extrusion or may be a polymer that is not an ester block copolymer or may be an ester block copolymer formed in a different process (e.g., a batch transesterification process). In alternate embodiments, the second polymer 458 is an ester block copolymer formed through in-line reactive extrusion and the first polymer 456 is not an ester block copolymer or is an ester block copolymer formed through a different process.

Feedblock 460 provides multilayer flows to coextrusion die 470 which produces a multilayer melt 475 that is cooled at casting station 480 which produces un-stretched multilayer film 485. Suitable coextrusion dies are described in U.S. Pat. No. 6,767,492 (Norquist et al.), for example. Casting station 480 may include a chill roll to quench multilayer melt 475. Un-stretched multilayer film 485 is stretched on stretcher 490, which may be a length orienter, or a tenter frame stretcher, or a combination of a length orienter and a tenter frame stretcher in sequence, and may biaxially or uniaxially stretch the un-stretched multilayer film 485 to produce stretched multilayer film 495. Stretcher 490 may stretch the multilayer film in two direction sequentially (e.g., stretch in the machine direction and then stretch in the transverse direction) or may simultaneously stretch in two in-plane directions. Additional processing steps may be included to add a primer and a hardcoat layer to one major surface of multilayer film 495 and/or to add an adhesive layer to the opposite major surface of multilayer film 495.

EXAMPLES

Materials

Modified PET refers to an ester block copolymer that includes PET blocks at greater than 50 weight percent of the ester block copolymer. Modified SA-PET refers to an ester block copolymer that includes SA-PET blocks at greater than 50 weight percent of the ester block copolymer.

SA-PET pellets were obtained from Dow Chemical (Midland, Mich.).

Nanya 1N502 PET pellets were obtained from Nanya Technology Corporation (Taiwan).

Nanya 1N404 PET pellets were obtained from Nanya Technology Corporation (Taiwan).

PETG pellets were obtained from Eastman Chemical (Kingsport, Tenn.) under the tradename PETg 6763.

Test Methods

Haze of film samples was determined using a HAZE-GARD PLUS meter available from BYK-Gardner Inc. (Silver Springs, Md.) according to ASTM D1003-13.

Graves tear resistance was determined according to ASTM D1004-13 in which a sample is cut with a die specified in the test standard and a force is applied to the sample using a constant rate-of-crosshead-movement type testing machine to tear the sample. An applied force as a function of the percent elongation of the sample can be determined from the test. The Graves Area in each of the MD and TD directions was determined as the area under the force versus percent elongation curve.

Puncture-Propagation Tear (PPT) resistance was determined as described in ASTM D2582-09 except that a carriage weight of 698.5 grams and a drop height of 17.0 cm was used.

Modified SA-PET Film

Modified SA-PET cast webs were prepared by reacting the polymers of PET (Nanya 1N502 PET) and SA-PET in the various ratios listed in Table 1. The reaction took place in an in-line reactive extrusion process. The polymers experienced distributions of temperatures, pressures and reaction times as the polymers flowed through the in-line reactor. The reaction conditions were selected such that the distribution of temperatures was in the range of 200-300° C., the distribution of pressures was in the range of 500 psi (3.4 MPa)-2000 psi (13.8 MPa), and distribution of reaction times was in the range of 3 min to 30 min. The conditions were chosen so that the blocky structure would be present without completely randomizing the polyester structures. The reaction was done using a twin screw extruder with processing variables controlled to achieve the above reaction conditions. The molten melt was then cast on a chilled roll held at a temperature in the range of about 20° C. to about 50° C. to obtain a cast web.

The haze of cast webs of various modified SA-PET block copolymers and of SA-PET were measured. The cast webs had a thickness of about 30 mils (0.76 mm) The haze of the SA-PET cast web was about 60.3 percent. The haze of the modified SA-PET cast webs after 7 days aging at RT and 50% humidity are reported in Table 1.

TABLE 1

| Wt. % SA-PET Blocks | Wt. % PET Blocks | Wt. % PETG Blocks | Haze (%) |
|---|---|---|---|
| 95 | 5 | 0 | 69.4 |
| 95 | 0 | 5 | 53.0 |
| 90 | 10 | 0 | 24.7 |
| 90 | 0 | 10 | 12.7 |
| 85 | 15 | 0 | 15.8 |
| 85 | 0 | 15 | 5.5 |
| 75 | 25 | 0 | 4.4 |
| 75 | 0 | 25 | 4.3 |

PET/PETG Ester Block Copolymer Film

PET/PETG ester block copolymer cast webs were prepared by reacting the polymers of PET (Nanya 1N502 PET) and PETG in the various ratios listed in Table 2. The reaction took place in an in-line reactive extrusion process. The polymers experienced distributions of temperatures, pressures and reaction times as the polymers flowed through the in-line reactor. The reaction conditions were selected such that the distribution of temperatures was in the range of 200-300° C., the distribution of pressures was in the range of 500 psi (3.4 MPa)-2000 psi (13.8 MPa), and distribution of reaction times was in the range of 3 min to 30 min. The conditions were chosen so that the blocky structure would be present without completely randomizing the polyester structures. The reaction was done using a twin screw extruder with processing variables controlled to achieve the above reaction conditions. The molten melt was then cast on a chilled roll held at a temperature in the range of about 20° C. to about 50° C. to obtain a cast web.

The haze of cast webs of various PET/PETG ester block copolymer films and of PET and PETG films were measured. The cast webs had a thickness of about 50 mils (1.3 mm) The measured values of haze of the cast webs after 7 days aging at RT and 50% humidity are reported in Table 2.

TABLE 2

| Wt. % PET Blocks | Wt. % PETG Blocks | Haze (%) |
|---|---|---|
| 100 | 0 | 9.7 |
| 80 | 20 | 4.1 |
| 60 | 40 | 3.2 |
| 50 | 50 | 3.1 |
| 40 | 60 | 2.6 |
| 20 | 80 | 1.4 |
| 0 | 100 | 1.3 |

The various cast webs were biaxially stretched at a draw ratio of about 3.5×3.5 to produce 4 mil (102 μm) films. The haze of the films after 7 days aging at RT and 50% humidity were measured and are reported in Table 3.

TABLE 3

| Wt. % PET Blocks | Wt. % PETG Blocks | Haze (%) |
| --- | --- | --- |
| 100 | 0 | 2.90 |
| 80 | 20 | 0.87 |
| 60 | 40 | 0.66 |
| 50 | 50 | 0.73 |
| 40 | 60 | 0.50 |
| 20 | 80 | 0.33 |
| 0 | 100 | 0.33 |

Comparative Example C-1

PET (Nanya 1N404 PET) resin was fed through a single screw extruder at a feeding rate of about 1900 kg/hr and SA-PET resin was fed through a twin screw extruder at a feeding rate of about 90 kg/hr. The melt temperature for PET was about 546° F. (286° C.) and the melt temperature for SA-PET was about 495° F. (257° C.). The melt streams were guided into a 13-layer feedblock to form alternating layers of PET and SA-PET. The melt was then spread in a film die and cast on a chilled roll to form cast web. The cast web was then sequentially stretched in the MD direction and the TD direction at draw ratios of 3.2 and 3.3, respectively. The cast line speed was adjusted such that the finished film thickness was about 8 mils (203 µm).

Example 1

PET (Nanya 1N404 PET) and PETG at a weight ratio of 80 to 20 was fed through a single screw extruder at a total feeding rate of about 1900 kg/hr under the processing conditions described under "PET/PETG Ester Block Copolymer Film" to produce a modified PET melt stream. SA-PET resin was fed through a twin screw extruder at a feeding rate of about 90 kg/hr to produce an SA-PET melt stream. The melt temperature for modified PET was about 546° F. (286° C.) and the melt temperature for SA-PET was about 495° F. (257° C.). The melt streams were guided into a 13-layer feedblock to form alternating layers of modified PET and SA-PET. The melt was then spread in a film die and cast on a chilled roll to form cast web. The cast web was then sequentially stretched in the MD direction and the TD direction at draw ratios of 3.2 and 3.3, respectively. The cast line speed was adjusted such that the finished film thickness was about 8 mils (203 µm).

Example 2

PET (Nanya PET 1N404) and PETG at a weight ratio of 80 to 20 was fed through a single screw extruder at a total feeding rate of about 1900 kg/hr under the processing conditions described under "PET/PETG Ester Block Copolymer Film" to produce a modified PET melt stream. SA-PET and PETG at a weight ratio of 80 to 20 was fed through a twin screw extruder at a total feeding rate of about 90 kg/hr under the processing conditions described under "Modified SA-PET Film" to produce a modified SA-PET melt stream. The melt temperature for the modified PET was about 546° F. (286° C.) and the melt temperature for the modified SA-PET was about 495° F. (257° C.). The melt streams were guided into a 13-layer feedblock to form alternating layers of modified PET and modified SA-PET. The melt was then spread in a film die and cast on a chilled roll to form cast web. The cast web was then sequentially stretched in the MD direction and the TD direction at draw ratios of 3.2 and 3.3, respectively. The cast line speed was adjusted such that the finished film thickness was about 8 mils (203 µm).

The haze of the finished films of Comparative Example C-1 and of Examples 1-2 was monitored using a HAZE-GARD PLUS haze meter for a period of time of 8 days to identify the haze difference among the different material compositions. The haze was observed to rise over a few days and then to stabilize. The resulting stabilized haze values are reported in Table 4.

TABLE 4

| Example | Haze (%) |
| --- | --- |
| C-1 | 2.2 |
| 1 | 1.6 |
| 2 | 0.9 |

Graves tear resistance and PPT tear resistance of the finished films were measured in the MD and TD directions. The Graves maximum force and Graves maximum elongation at break are reported in Table 5 and the Graves Area and PPT tear resistance are reported in Table 6.

The results show that haze can be significantly lowered compared to Comparative Example C-1 while adequate tear resistance is maintained.

TABLE 5

| Example | Graves Force, MD (N) | Graves Force, TD (N) | Graves Percent Elongation, MD | Graves Percent Elongation, TD |
| --- | --- | --- | --- | --- |
| C-1 | 169.1 | 171.3 | 46.3 | 49.4 |
| 1 | 157.5 | 158 | 45.3 | 50.2 |
| 2 | 158.4 | 164.2 | 33.3 | 32.5 |

TABLE 6

| Example | Graves Area, MD (N × %) | Graves Area, TD (N × %) | PPT, MD (grams) | PPT, TD (grams) |
| --- | --- | --- | --- | --- |
| C-1 | 4619 | 4744 | 3440 | 4690 |
| 1 | 4143 | 5029 | 3063 | 4393 |
| 2 | 2830 | 2875 | 2943 | 4393 |

Additional examples can be prepared by feeding the modified SA-PET melt stream of Example 2 and a conventional PET melt stream into a 13-layer feedblock, for example, to form alternating layers of PET and modified SA-PET. The resulting 13-layer melt can then be cast and stretched as in Example 2. Further examples can be prepared by modifying the proportions of PET and PETG used to make a modified PET melt stream and/or the proportions of SA-PET and PETG used to make a modified SA-PET melt stream as described under "PET/PETG Ester Block Copolymer Film" and "Modified SA-PET Film", respectively.

The following is a list of exemplary embodiments of the present description.

Embodiment 1 is a tear resistant multilayer film comprising:
    a stack of polymeric layers comprising first and second layer types, the polymeric layers of the first layer type comprising a first polymer and the polymeric layers of the second layer type comprising a second polymer, the polymeric layers arranged such that no two layers of the first layer type are immediately adjacent and such that no two layers of the second layer type are immediately adjacent, wherein the first polymer is polyethylene terephthalate or a first ester block copolymer comprising polyethylene terephthalate blocks at a weight percent of the first ester block copolymer of at least 50 percent, the ester block copolymer further comprising glycol-modified polyethylene terephthalate blocks;

wherein the second polymer is sebacic acid-substituted polyethylene terephthalate or a second ester block copolymer comprising sebacic acid-substituted polyethylene terephthalate blocks at a weight percent of the second ester block copolymer of at least 50 percent, the second ester block copolymer further comprising polyethylene terephthalate blocks, glycol-modified polyethylene terephthalate blocks, or a combination thereof;

wherein the tear resistant multilayer film includes a total number of layers of the first and second layer types in a range of 8 to 300; and wherein at least one following conditions is satisfied:
(i) the first polymer is the first ester block copolymer and comprises glycol-modified polyethylene terephthalate blocks at a weight percent of the first ester block copolymer of at least about 5 percent, and
(ii) the second polymer is the second ester block copolymer and comprises polyethylene terephthalate blocks, glycol-modified polyethylene terephthalate blocks, or a combination thereof at a weight percent of the second ester block copolymer of at least about 5 percent.

Embodiment 2 is the tear resistant multilayer film of embodiment 1, wherein the second polymer is the second ester block copolymer and comprises sebacic acid-substituted polyethylene terephthalate blocks at a weight percent of the second ester block copolymer in a range from about 70 percent to about 90 percent.

Embodiment 3 is the tear resistant multilayer film of embodiment 1, wherein the second polymer is the second ester block copolymer and comprises polyethylene terephthalate blocks, glycol-modified polyethylene terephthalate blocks, or a combination thereof at a weight percent of the second ester block copolymer in a range from about 5 percent to about 30 percent.

Embodiment 4 is the tear resistant multilayer film of embodiment 1, wherein the first polymer is the first ester block copolymer and comprises polyethylene terephthalate blocks at a weight percent of the first ester block copolymer in a range from about 60 percent to about 95 percent.

Embodiment 5 is the tear resistant multilayer film of embodiment 1, wherein the first polymer is the first ester block copolymer and comprises glycol-modified polyethylene terephthalate blocks at a weight percent of the first ester block copolymer in a range from about 5 percent to about 40 percent.

Embodiment 6 is the tear resistant multilayer film of embodiment 1, wherein the first polymer is the first ester block copolymer and the second polymer is the second ester block copolymer and wherein the first ester block copolymer comprises glycol-modified polyethylene terephthalate blocks at a weight percent of the first ester block copolymer of at least about 5 percent and the second ester block copolymer comprises polyethylene terephthalate blocks, glycol-modified polyethylene terephthalate blocks, or a combination thereof at a weight percent of the second ester block copolymer of at least about 5 percent.

Embodiment 7 is the tear resistant multilayer film of embodiment 6, wherein the first ester block copolymer comprises glycol-modified polyethylene terephthalate blocks at a weight percent of the first ester block copolymer in a range of about 5 percent to about 40 percent and the second ester block copolymer comprises polyethylene terephthalate blocks, glycol-modified polyethylene terephthalate blocks, or a combination thereof at a weight percent of the second ester block copolymer in a range of about 5 percent to about 30 percent.

Embodiment 8 is the tear resistant multilayer film of embodiment 1, wherein the sebacic acid-substituted polyethylene terephthalate or the sebacic acid-substituted polyethylene terephthalate blocks comprises the reaction product of about 50 to about 70 mole equivalents terephthalic acid, about 50 to about 30 mole equivalents sebacic acid, and about 100 mole equivalents ethylene glycol.

Embodiment 9 is the tear resistant multilayer film of embodiment 1, wherein at least one of the first and second polymers comprise glycol-modified polyethylene terephthalate blocks that comprise the reaction product of about 100 mole equivalents terephthalic acid, about 70 to about 98 mole equivalents ethylene glycol and about 30 to about 2 mole equivalents cyclohexanedimethanol.

Embodiment 10 is the tear resistant multilayer film of embodiment 1, wherein the total number of layers of the first and second layer types is in a range of 9 to 30.

Embodiment 11 is the tear resistant multilayer film of embodiment 1, wherein the tear resistant multilayer film is substantially transparent and has a haze less than about 2 percent.

Embodiment 12 is the tear resistant multilayer film of embodiment 1, wherein the tear resistant multilayer film has a Graves Area of at least 1000 N × % in each of a first direction and a second direction different from the first direction.

Embodiment 13 is the tear resistant multilayer film of embodiment 1, wherein the polymeric layers are biaxially oriented.

Embodiment 14 is the tear resistant multilayer film of embodiment 1, wherein the first and second layer types alternate in the stack.

Embodiment 15 is the tear resistant multilayer film of embodiment 1 further comprising a primer layer disposed on a first outermost layer of the stack of polymeric layers and a hard coat layer disposed on the primer layer.

Embodiment 16 is the tear resistant multilayer film of embodiment 15 further comprising an optically clear adhesive layer disposed on a second outermost layer of the stack of polymeric layers opposite the first outermost layer of the stack of polymeric layers.

Embodiment 17 is a laminate comprising:
a glass having a first major surface and an opposing second major surface; and
a first tear resistant multilayer film according to embodiment 16 attached to the glass, the optically clear adhesive layer of the first tear resistant multilayer film disposed on the first major surface of the glass.

Embodiment 18 is the laminate of embodiment 17 further comprising a second tear resistant multilayer film according to embodiment 16 attached to the glass opposite the first tear resistant multilayer film, the optically clear adhesive layer of the second tear resistant multilayer film disposed on the second major surface of the glass.

Embodiment 19 is a method of making the tear resistant multilayer film of embodiment 1 comprising the step of coextruding a plurality of layers of the first and second polymers in their molten states.

Embodiment 20 is the method of embodiment 19, wherein at least one of the first and second polymers is formed by transesterification of two or more polyesters through in-line reactive extrusion at temperature range from 200° C. to 350° C.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A tear resistant multilayer film comprising:
a stack of polymeric layers comprising a plurality of first layers and a plurality of second layers each layer in the plurality of first layers comprising a first polymer and each layer in the plurality of second layers comprising a second polymer, the polymeric layers arranged such that no two first layers are immediately adjacent and such that no two second layers are immediately adjacent,
wherein the first polymer is polyethylene terephthalate or a first ester block copolymer comprising polyethylene terephthalate blocks at a weight percent of the first ester block copolymer of at least 50 percent, the first ester block copolymer further comprising glycol-modified polyethylene terephthalate blocks;
wherein the second polymer is sebacic acid-substituted polyethylene terephthalate or a second ester block copolymer comprising sebacic acid-substituted polyethylene terephthalate blocks at a weight percent of the second ester block copolymer of at least 50 percent, the second ester block copolymer further comprising polyethylene terephthalate blocks, glycol-modified polyethylene terephthalate blocks, or a combination thereof;
wherein the tear resistant multilayer film is substantially transparent;
wherein the tear resistant multilayer film includes a total number of layers of the first and second layers in a range of 8 to 300; and
wherein at least one following conditions is satisfied:
(i) the first polymer is the first ester block copolymer and comprises glycol-modified polyethylene terephthalate blocks at a weight percent of the first ester block copolymer of no less than 5 percent, and
(ii) the second polymer is the second ester block copolymer and comprises polyethylene terephthalate blocks, glycol-modified polyethylene terephthalate blocks, or a combination thereof at a weight percent of the second ester block copolymer of no less than 5 percent.

2. The tear resistant multilayer film of claim 1, wherein the second polymer is the second ester block copolymer and comprises sebacic acid-substituted polyethylene terephthalate blocks at a weight percent of the second ester block copolymer in a range from about 70 percent to about 90 percent.

3. The tear resistant multilayer film of claim 1, wherein the second polymer is the second ester block copolymer and comprises polyethylene terephthalate blocks, glycol-modified polyethylene terephthalate blocks, or a combination thereof at a weight percent of the second ester block copolymer in a range from about 5 percent to about 30 percent.

4. The tear resistant multilayer film of claim 1, wherein the first polymer is the first ester block copolymer and comprises polyethylene terephthalate blocks at a weight percent of the first ester block copolymer in a range from about 60 percent to about 95 percent.

5. The tear resistant multilayer film of claim 1, wherein the first polymer is the first ester block copolymer and comprises glycol-modified polyethylene terephthalate blocks at a weight percent of the first ester block copolymer in a range from about 5 percent to about 40 percent.

6. The tear resistant multilayer film of claim 1, wherein the first polymer is the first ester block copolymer and the second polymer is the second ester block copolymer and wherein the first ester block copolymer comprises glycol-modified polyethylene terephthalate blocks at a weight percent of the first ester block copolymer of at least 5 percent and the second ester block copolymer comprises polyethylene terephthalate blocks, glycol-modified polyethylene terephthalate blocks, or a combination thereof at a weight percent of the second ester block copolymer of no less than 5 percent.

7. The tear resistant multilayer film of claim 6, wherein the first ester block copolymer comprises glycol-modified polyethylene terephthalate blocks at a weight percent of the first ester block copolymer in a range of about 5 percent to about 40 percent and the second ester block copolymer comprises polyethylene terephthalate blocks, glycol-modified polyethylene terephthalate blocks, or a combination thereof at a weight percent of the second ester block copolymer in a range of about 5 percent to about 30 percent.

8. The tear resistant multilayer film of claim 1, wherein the sebacic acid-substituted polyethylene terephthalate or the sebacic acid-substituted polyethylene terephthalate blocks comprises the reaction product of about 50 to about 70 mole equivalents terephthalic acid, about 50 to about 30 mole equivalents sebacic acid, and about 100 mole equivalents ethylene glycol.

9. The tear resistant multilayer film of claim 1, wherein at least one of the first and second polymers comprise glycol-modified polyethylene terephthalate blocks that comprise the reaction product of about 100 mole equivalents terephthalic acid, about 70 to about 98 mole equivalents ethylene glycol and about 30 to about 2 mole equivalents cyclohexanedimethanol.

10. The tear resistant multilayer film of claim 1, wherein the total number of the first and second layers is in a range of 9 to 30.

11. The tear resistant multilayer film of claim 1, wherein the tear resistant multilayer film is substantially transparent and has a haze less than about 2 percent.

12. The tear resistant multilayer film of claim 1, wherein the tear resistant multilayer film has a Graves Area of at least 1000 N × % in each of a first direction and a second direction different from the first direction.

13. The tear resistant multilayer film of claim 1, wherein the polymeric layers are biaxially oriented.

14. The tear resistant multilayer film of claim 1, wherein the first and second layers alternate in the stack.

15. The tear resistant multilayer film of claim 1 further comprising a primer layer disposed on a first outermost layer of the stack of polymeric layers and a hard coat layer disposed on the primer layer.

16. The tear resistant multilayer film of claim 15 further comprising an optically clear adhesive layer disposed on a second outermost layer of the stack of polymeric layers opposite the first outermost layer of the stack of polymeric layers.

17. A laminate comprising:
 a glass having a first major surface and an opposing second major surface; and
 a first tear resistant multilayer film according to claim 16 attached to the glass, the optically clear adhesive layer of the first tear resistant multilayer film disposed on the first major surface of the glass.

18. A laminate comprising:
 a glass having a first major surface and an opposing second major surface;
 a first tear resistant multilayer film according to claim 16 attached to the glass; and
 a second tear resistant multilayer film according to claim 16 attached to the glass opposite the first tear resistant multilayer film;
 the optically clear adhesive layer of the first tear resistant multilayer film disposed on the first major surface of the glass, the optically clear adhesive layer of the second tear resistant multilayer film disposed on the second major surface of the glass.

19. A method of making the tear resistant multilayer film of claim 1 comprising a step of coextruding a plurality of layers of the first and second polymers in their molten states.

20. The method of claim 19, wherein at least one of the first and second polymers is formed by transesterification of two or more polyesters through in-line reactive extrusion at temperature range from 200° C. to 350° C.

* * * * *

UNITED STATES PATENT AND TRADEMARK OFFICE
CERTIFICATE OF CORRECTION

PATENT NO.        : 9,776,381 B2
APPLICATION NO.   : 14/574820
DATED             : October 3, 2017
INVENTOR(S)       : Richard Liu et al.

Page 1 of 1

It is certified that error appears in the above-identified patent and that said Letters Patent is hereby corrected as shown below:

In the Specification

Column 6
Line 20; Delete "both be" and insert -- both --, therefor.

Column 6
Line 61; After "determined" insert -- . --, therefor.

Column 10
Line 11; After "mm)" insert -- . --, therefor.

Column 10
Line 52; After "mm)" insert -- . --, therefor.

In the Claims

Column 15
Line 28; In Claim 1, Delete "layers" and insert -- layers, --, therefor.

Column 16
Lines 58-59; In Claim 11, After "film" delete "is substantially transparent and", therefor.

Column 16
Line 62; In Claim 12, Delete "in in" and insert -- in --, therefor.

Signed and Sealed this
Nineteenth Day of June, 2018

Andrei Iancu
*Director of the United States Patent and Trademark Office*